Jan. 23, 1951 A. O. BROOKE 2,539,055
DEVICE FOR CONVEYING AND FILLING TIRES
Filed May 28, 1948

Inventor
Arthur O. Brooke
By Spencer, Willits, Helwig & Baillio
Attorneys

UNITED STATES PATENT OFFICE 2,539,055

DEVICE FOR CONVEYING AND FILLING TIRES

Arthur O. Brooke, Santa Cruz, Calif., assignor to General Motors Corporation, Detroit, Mich., a corporation of Delaware Application May 28, 1948, Serial No. 29,905

7 Claims. (Cl. 226—20.6)

This invention relates to an improved tire inflation mechanism especially adapted for use in an automobile assembly plant to enable pneumatic tires, after being mounted on wheels, to be quickly filled with air to a given line pressure with a minimum of attention and manual effort.

In general there is involved a continuously moving conveyor and an air hose nozzle to be hand applied and clutched to the valve stem of a tire placed on the conveyor at a loading station, together with clutch release and nozzle retracting mechanism operable automatically as the conveyor carries the tire to an unloading station.

It is among the objects of the invention to provide a simple and inexpensive arrangement of the character described as well as an improved releasable air nozzle and clutch operating control mechanism therefor.

Figure 1:
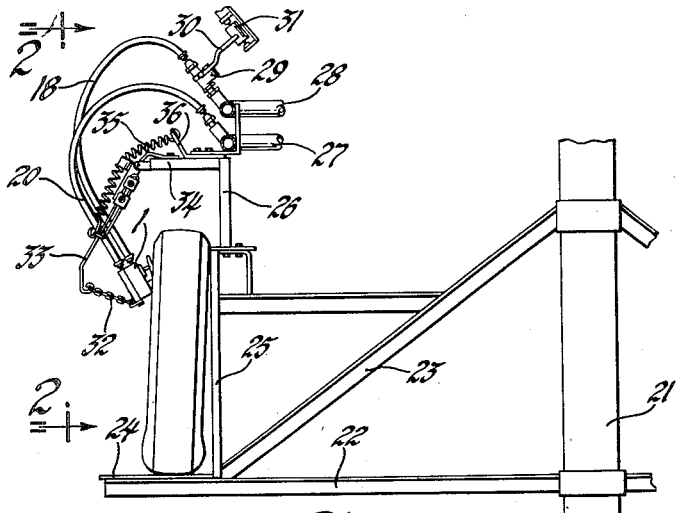
Figure 2:
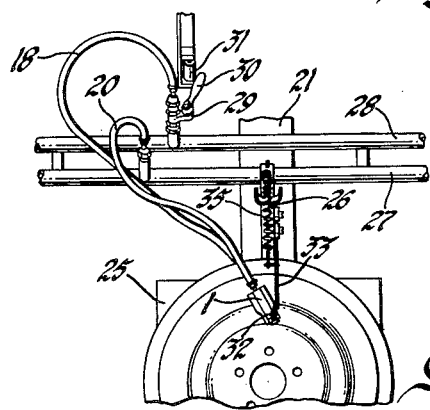
Figure 3:
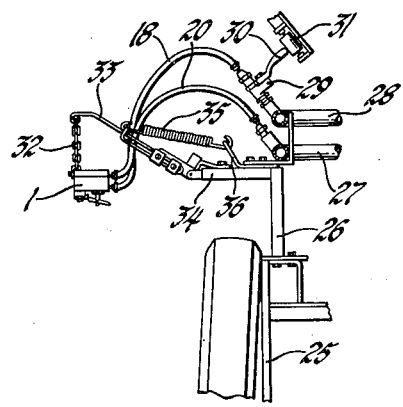
Figure 4:
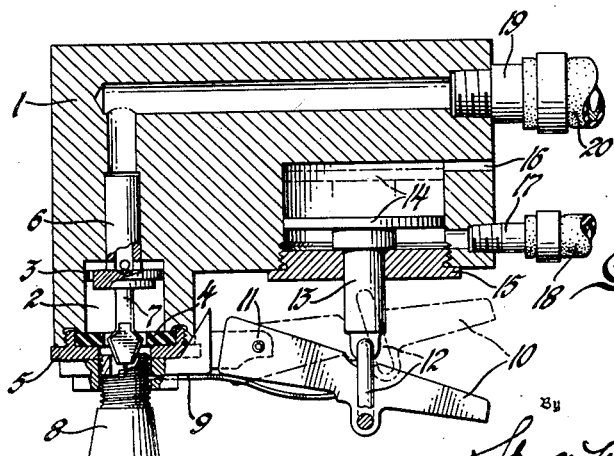

Other objects and advantages will become apparent during the course of the following specification having reference to the accompanying drawing, wherein Figure 1 is an elevation, partly in section, of a conveyor having mounted thereon a tire with the inflation nozzle applied thereto; Figure 2 is a fragmentary elevation of the parts as viewed on line 2—2 of Figure 1; Figure 3 is a view somewhat like Figure 1 but with the inflation nozzle in retracted position and Figure 4 is an enlarged sectional view of the detachable air nozzle.

The air nozzle shown in the drawing, like any well known device of its kind, includes a cast metal body 1 having passages and chambers formed therein for air flow. At its outlet end there is formed the usual enlarged chamber 2 containing a conventional type of valve 3 which when the nozzle is detached from the tire stem is held closed by air pressure against a sealing seat 4 secured in place by a cover 5. Extending upwardly from the valve 3 is a hollow guide extension 6 and projected downwardly is the usual stem 7 provided to engage with the end of the usual valve mounted within the tire stem 8 when the threaded end of the stem is fitted within the nozzle cap piece 5.

The separable parts referred to are latched together by means of a chuck in the form of a spring blade 9 slidable through a slot in the cover 5 and into engagement with the tire stem. Ordinarily the sliding operation of the chuck 9 is by means of its attachment to a pivoted handle or finger piece 10 secured by a pivot pin 11 between a pair of ears which are carried by the cap piece 5. In the present instance a link 12 is pivoted at opposite ends to the lever 10 and to the stem 13 of a pressure responsive device or piston 14 slidable within a chamber formed within the body 1 and closed by a plug 15. The upper end of the piston chamber is vented as by means of a passage 16 through the body and the piston 14 can be forced upwardly to swing the handle 10 and unlatch the clutch 9 for the separation of the nozzle from the valve stem. Air under pressure can be introduced to the piston chamber through a fitting 17 and a flexible hose connection 18 leading from a suitable valve controlling air flow. Air under pressure for inflating the tire reaches the nozzle passages through a fitting 19 and an air hose 20 leading from a suitable source of air pressure supply. If the main source of air pressure supply for the hose 20 is maintained at a constant pressure corresponding to that to which the tire or other inflatable container is to be inflated, it will be apparent that after a given interval or time lapse the filling operation will be complete. Accordingly, a timing mechanism can be employed to control delivery of a shot of air through the hose 18 for actuating the piston 14 and releasing the nozzle from the tire stem.

In the present instance, the timing mechanism conveniently consists of a conveyor structure moving at a given rate of speed between a tire loading station and a tire unloading station. Thus there may be provided a conveyor in the nature of a rotary support or turntable, including as shown in Figure 1, a center post 21 having radial arms 22 and 23 terminating in a tire platform or support 24 which may extend continuously circularly or may be one of several circumferentially spaced sections, each platform section constituting a tire support as the turntable rotates between suitably spaced loading and unloading stations. Each tire receiving platform includes a vertical back or rest board 25 from which a plate 26 extends upwardly and assists in supporting a pair of circular pipes 27 and 28 which contain air under pressure. The tire filling hose 20 is joined to the pipe 27 and the clutch release hose 18 is joined to a normally closed valve 29 associated with the supply conduit 28. A laterally projecting operating handle 30 is provided for the control valve 29 and this handle is arranged to be engaged by an abutment roller 31 fixed in relation to the conveyor travel at or adjacent the unloading station. Thus as the handle moves with the turntable and reaches the neighborhood of the unloading station the handle engages with the abutment roller 31 for opening the valve and sending a shot of air to the clutch release piston and after the handle moves with the conveyor past the abutment it again returns to normal valve closing position.

For supporting the weight of the nozzle and for retracting it and holding it out of the way when the nozzle is disengaged from the tire a simple supporting mechanism is provided in the form of a flexible chain 32 joining the nozzle to a hinged arm 33 pivoted to the outer end of a fixed arm 34 projecting outwardly from the supporting plate 26. A coil spring 35 has one end anchored to a fixed bracket 36 fastened to the arm 34 and has its opposite end secured to the swinging arm 33 at a point intermediate the extremity of the arm and the pivot for the swinging arm. Thus the force of the spring ordinarily tends to hold the nozzle supporting arm in the retracted position illustrated in Figure 3. It is expanded when the arm is swung downwardly upon the manual application of the nozzle to a tire stem at the tire loading station. As soon as the tire reaches the predetermined point in its travel in which the nozzle is disengaged from the tire stem the spring will cause the arm to be retracted so that it is out of the way and offers no interference of removal from the inflated tire. If desired suitable guides may be employed which automatically will cause the tire to roll off from the conveyor and into a storage chute according to conventional practice.

I claim:

1. In a tire inflating mechanism, a tire supporting conveyor movable at a predetermined rate of speed between tire loading and unloading stations, means for conveying air under a constant predetermined pressure movable with said conveyor, a tire inflating nozzle connected to said air conveying means for attachment to the valve stem of a tire to be inflated, latching means carried by said nozzle for securing said nozzle to said valve stem, latch release means associated with said latching means, and means in the path of travel of said conveyor engaging said release means for releasing said latching means.

2. In a tire inflating mechanism, a tire supporting conveyor movable at a predetermined rate of speed between tire loading and unloading stations, means for conveying air under a constant predetermined pressure movable with said conveyor, a tire inflating nozzle connected to said air conveying means for attachment to the valve stem of a tire to be inflated, latching means carried by said nozzle for securing said nozzle to said valve stem, air pressure responsive means for releasing said latching means, and means fixed in the path of travel of said conveyor engageable by said pressure responsive means to actuate the same to release said latching means.

3. In a tire inflating mechanism, a tire supporting conveyor movable at a predetermined rate of speed between tire loading and unloading stations, means for conveying air under a constant predetermined pressure movable with said conveyor, a tire inflating nozzle connected to said air conveying means for attachment to the valve stem of a tire to be inflated, latching means carried by said nozzle for securing said nozzle to said valve stem, air pressure responsive means including a control element for releasing said latching means, and means fixed in the path of travel of said conveyor engageable with said control element to actuate said pressure responsive means to release said latching means.

4. In a tire inflating mechanism, a tire supporting conveyor movable at a predetermined rate of speed between tire loading and unloading stations, means for conveying air under a constant predetermined pressure movable with said conveyor, a tire inflating nozzle carried by said conveyor and connected to said air conveying means for attachment to the valve stem of a tire to be inflated, latching means carried by said nozzle for securing said nozzle to said valve stem, air responsive means for releasing said latching means, a control element for said latch releasing means, and means fixed in relation to conveyor travel and located in the path of said control element to be engaged thereby for actuating said pressure responsive means to release said latching means.

5. In a tire inflating mechanism, a tire supporting conveyor movable at a predetermined rate of speed between tire loading and unloading stations, means for conveying air under a constant predetermined pressure movable with said conveyor, a tire inflating nozzle carried by said conveyor and connected to said air conveying means for attachment to the valve stem of a tire to be inflated, latching means carried by said nozzle for securing said nozzle to said valve stem, air responsive means for releasing said latching means, a control element for said latch releasing means, and means fixed in relation to conveyor travel and located adjacent the unloading station in the path of said control element to be engaged thereby for actuating said pressure responsive means, for the purpose set forth.

6. In a tire inflating mechanism, a tire supporting conveyor movable at a predetermined rate of speed between tire loading and unloading stations, means for conveying air under a constant predetermined pressure movable with said conveyor, a tire inflating nozzle carried by said conveyor and connected to said air conveying means for attachment to the valve stem of a tire to be inflated, latching means carried by said nozzle for securing said nozzle to said valve stem, means including a pivoted arm for mounting said nozzle on said conveyor, spring means for retracting said nozzle when the nozzle is released from engagement with the valve stem, and latch release means associated with said latching means.

7. In a tire inflating mechanism, a tire supporting conveyor movable at a predetermined rate of speed between tire loading and unloading stations, means for conveying air under a constant predetermined pressure movable with said conveyor, a tire inflating nozzle carried by said conveyor and connected to said air conveying means for attachment to the valve stem of a tire to be inflated, latching means carried by said nozzle for securing said nozzle to said valve stem, means including a pivoted arm for mounting said nozzle on said conveyor, spring means for retracting said nozzle when the nozzle is released from engagement with the valve stem, air responsive means for releasing said latching means, a control element for said latch releasing means, and means fixed in relation to conveyor travel and located adjacent the unloading station in the path of said control element to be engaged thereby for actuating said pressure responsive means, for the purpose set forth.

ARTHUR O. BROOKE.

REFERENCES CITED

The following references are of record in the file of this patent:

UNITED STATES PATENTS

| Number | Name | Date |
| --- | --- | --- |
| 1,611,239 | Sanford | Dec. 21, 1926 |
| 1,738,491 | Brown | Dec. 3, 1929 |